(12) United States Patent
Ding et al.

(10) Patent No.: US 9,137,153 B2
(45) Date of Patent: Sep. 15, 2015

(54) INTERWORKING BETWEEN ETHERNET AND MPLS

(75) Inventors: Zhemin Ding, Stockholm (SE); Panagiotis Saltsidis, Stockholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 173 days.

(21) Appl. No.: 13/807,102

(22) PCT Filed: Jun. 28, 2010

(86) PCT No.: PCT/SE2010/050741
§ 371 (c)(1),
(2), (4) Date: Dec. 27, 2012

(87) PCT Pub. No.: WO2012/002850
PCT Pub. Date: Jan. 5, 2012

(65) Prior Publication Data
US 2013/0094512 A1 Apr. 18, 2013

(51) Int. Cl.
*H04L 12/28* (2006.01)
*H04L 12/723* (2013.01)
*H04L 12/46* (2006.01)

(52) U.S. Cl.
CPC .......... *H04L 45/502* (2013.01); *H04L 12/4654* (2013.01); *H04L 12/4658* (2013.01)

(58) Field of Classification Search
USPC ................. 370/254–285, 392–395, 401–466; 709/238–249
See application file for complete search history.

(56) References Cited

U.S. PATENT DOCUMENTS

| 7,453,888 | B2* | 11/2008 | Zabihi et al. ................... 370/400 |
| 8,014,410 | B2* | 9/2011 | Sergeev et al. ................ 370/401 |
| 8,175,078 | B2* | 5/2012 | Voit et al. ...................... 370/351 |
| 8,213,435 | B2* | 7/2012 | Sajassi ..................... 370/395.53 |
| 8,385,341 | B2* | 2/2013 | Kern et al. .................... 370/390 |
| 8,483,218 | B2* | 7/2013 | Lee et al. ....................... 370/392 |
| 8,504,727 | B2* | 8/2013 | Mohan et al. ................. 709/249 |
| 8,619,784 | B2* | 12/2013 | Figueira et al. ............ 370/395.3 |
| 2005/0169270 | A1* | 8/2005 | Mutou et al. .................. 370/390 |

FOREIGN PATENT DOCUMENTS

WO WO 2008091637 A2 7/2008

* cited by examiner

*Primary Examiner* — Man Phan (57) ABSTRACT

A network bridge configured to convey customer traffic between a customer equipment and any of an MPLS network and an Ethernet network is disclosed. The network bridge comprises a C-VLAN component, an S-VLAN component and an MPLS component. The C-VLAN component can receive an Ethernet frame that carries the customer traffic, and forward the Ethernet frame to the S-VLAN component or to the MPLS component in dependence of a C-VID value of the Ethernet frame. The MPLS component can, when the Ethernet frame is received from the C-VLAN component, add MPLS information to the Ethernet frame, and forward the Ethernet frame to the S-VLAN component. The S-VLAN component then forwards the Ethernet frame to any of the MPLS network and the Ethernet network. A related network core bridge, methods and computer-readable medium are also described.

16 Claims, 7 Drawing Sheets

INTERWORKING BETWEEN ETHERNET AND MPLS

TECHNICAL FIELD

The invention relates to a network bridge that is configured to convey customer traffic between a customer equipment and any of an MPLS network and an Ethernet network.

BACKGROUND

The following abbreviations are used throughout this document:
CEP Customer Edge Port
CNP Customer Network Port
C-VLAN Customer VLAN
C-VID Customer VLAN identifier
IEEE Institute of Electrical and Electronics Engineers
LER Label Edge Router
LSP Label Switched Path
LSR Label Switching Router
MAC address Media Access Control address
MCP MPLS Customer Port
MNP MPLS Network Port
MPLS Multiple Protocol Label Switching
MPLS-TP MPLS Transport Profile
PB Provider Bridge
PB-network Provider Bridged network
PEB Provider Edge Bridge
PEP Provider Edge Port
PNP Provider Network Port
S-VLAN Service VLAN
S-VID Service VLAN identifier
VLAN Virtual Local Area Network Ethernet has over the years become a common Local Area Network (LAN) technology. This achievement stems from the some characteristics of the technology, such as simple handling, the relatively low costs involved, convenient manageability and backward compatibility.

Also, the MEF (Metro Ethernet Forum) Ethernet services has contributed to the development of Ethernet technologies beyond the LAN environment resulting in functionalities for the support of advanced OAM (Operations, Administration and Maintenance), scalability and manageability. The main bulk of this effort is associated with various projects related to the interworking subgroup in IEEE 802.1. For example, the IEEE 802.1ad (provider bridges, or PB), the IEEE 802.1ah (provider backbone bridges, or PBB), the IEEE 802.1Qay (provider backbone bridges—traffic engineering, or PBB-TE), and the IEEE 802.1ag (connectivity fault management, or CFM) standards have addressed the issues of creating provider services using Ethernet infrastructure, scaling Ethernet networks, of supporting traffic engineered services and managing faults of Ethernet services.

Provider bridges, in particular, which is the first bridging technology standardized by IEEE for provider applications, enabled Ethernet and Ethernet bridging to rapidly become the technologies of choice for provider access and aggregation networks. It solves two problems presented by the application of enterprise IEEE 802.1Q bridges to provider networks. The first problem is separating the customer virtual LAN (VLAN) space from the provider VLAN space, and the second problem is allowing the provider the ability to multiplex many customer VLANs on a single provider VLAN. To address these problems a provider bridge supports the creation of service VLANs (S-VLANs) within an independent VLAN space that is controlled by the provider and used to carry customer VLANs (C-VLANs).

Multiprotocol Label Switching (MPLS), an architecture for fast packet switching and routing and provides the designation, routing, forwarding and switching of traffic flows through a network. More specifically, MPLS has mechanisms to manage traffic flows of various granularities and provides a way to map IP addresses to simple, fixed-length labels used by different packet-forwarding and packet-switching technologies. In MPLS, data transmission occurs on Label-Switched Paths (LSPs). The entry and exit points of an MPLS network are called Label Edge Routers (LERs). The entry LER pushes an MPLS label onto an incoming packet based on its destination and forwards the packet to the next Label Switch Router (LSR) on the LSP to the destination. The LSR will strip the label from the packet, look up the label to determine the next label to be applied to the packet and the next hop for the path, and forward the packet onward to the next hop. In this way, the packet is forwarded hop-by-hop across the LSP through the MPLS network.

MPLS Transport Profile (MPLS-TP) is proposed to enhance MPLS's capabilities and mechanisms to meet the requirements of transport network operations.

Today it is expected that some network operators want to migrate from an Ethernet network (or more specifically a PB-network) to an MPLS/MPLS-TP network when it becomes available. Migration from PB based services to MPLS/MPLS-TP based services may take a long time since Ethernet based networks and MPLS based networks use different technologies for routing and forwarding data in the respective network, and since the operators must negotiate with each single customer to keep any service disruption to a minimal level. Ideally, the Ethernet based services should be kept as before while at the same time MPLS based services can be offered to the customer.

SUMMARY

It is an object of the invention to at least partly fulfill one or more of the needs mentioned above. In particular, it is an object to provide technology that can convey customer data between a customer equipment and any of a node in an MPLS network and a node in an Ethernet network, and/or vice versa (i.e. from a node in the MPLS/Ethernet network to a customer equipment).

Hence a network bridge is provided, which is configured to convey customer traffic between a customer equipment and any of an MPLS network and an Ethernet network, the network bridge comprising a C-VLAN component, an S-VLAN component and an MPLS component. The C-VLAN component is configured to i) receive from the customer equipment an Ethernet frame that carries the customer traffic, and ii) forward the Ethernet frame to the S-VLAN component or to the MPLS component in dependence of a C-VID value of the Ethernet frame. The MPLS component is configured to, when the Ethernet frame is received from the C-VLAN component, i) add MPLS information to the Ethernet frame, and ii) forward the Ethernet frame to the S-VLAN component. The S-VLAN component is configured to i) forward the Ethernet frame to any of the MPLS network and the Ethernet network.

The network bridge may be a network edge bridge that can identify if the frame is to be forwarded as MPLS traffic or as Ethernet traffic, based on the C-VID identifier. For example, a provider of the network may agree that a C-VID value in the range of 1-4094 is reserved for MPLS traffic while other values are used for Ethernet traffic. More specifically, several C-VID values within this range can be reserved for MPLS traffic. The C-VID value(s) for MPLS traffic or Ethernet traffic is negotiated between operators and customers.

The frame may include a specific S-VID value that is reserved for MPLS traffic in a manner similar with the C-VID value. The S-VID can be included in the frame when it is received from the customer equipment. If no MPLS specific S-VID value is included, the MPLS component may add such a MPLS specific S-VID value, which then can be in the range of e.g. 1-4094. More specifically, several C-VID values within this range can be reserved for MPLS traffic.

The C-VLAN component, the S-VLAN component, Ethernet frame and C-VID per se can be implemented according to known standards and techniques. However, when cooperating as described above a bridge is accomplished which can convey customer data between a customer equipment and any of a node in an MPLS network and a node in an Ethernet network. As is known, the C-VID is part of a so called C-tag of the frame. Thus, if there is no C-tag there is no C-VID either.

The MPLS component may be configured to initiate and terminate Label Switched Paths. The MPLS component may also be configured to act as a Label Edge Router.

The MPLS component may comprise an MPLS customer port, MCP, which is connected to a provider edge port, PEP, of the C-VLAN component. Also, the MPLS component may comprise an MPLS network port, MNP, which is connected to a provider network port of the S-VLAN component.

The C-VLAN component may comprise a customer edge port dedicated to MPLS traffic from the customer equipment. Also, the C-VLAN component may comprise a provider edge port dedicated to Ethernet traffic to the S-VLAN component.

The C-VLAN component may comprise a provider edge port dedicated to MPLS traffic to the MPLS component.

The S-VLAN component may comprise an MPLS entity that is configured to act a Label Switch Router. Also, the S-VLAN component is configured to forward the Ethernet frame to the MPLS entity if the Ethernet frame is untagged or specifically tagged. A "specific tag" can the be represented by e.g. a certain S-VID value.

The S-VLAN component may comprise a provider network port configured to receive the Ethernet frame from the MPLS entity and act as an exiting port by forwarding the Ethernet frame to a node of any of the MPLS network and the Ethernet network.

The network bridge may have the form of a conventional network bridge that is upgraded with software instructions that implements the MPLS component. Also, the software instructions may implement the MPLS entity of the S-VLAN component.

The network bridge may comprise a central processing unit configured to execute software instructions that implements the MPLS component.

According to another aspect a network core bridge is provided, which is configured to convey customer traffic, the network core bridge comprising an S-VLAN component and an MPLS entity. The S-VLAN component is configured to i) receive from a network node an Ethernet frame that carries the customer traffic, and ii) forward the Ethernet frame to a next node or to the MPLS entity in dependence of a S-VID value of the Ethernet frame. The MPLS entity is configured to, when the Ethernet frame is received from the S-VLAN component, i) act a Label Switch Router and forward the Ethernet frame to a next node.

The network core bridge is based on the similar principles as the previously described network bridge. However, the network core bridge used the S-VID instead of the C-VID. The S-VID parameter is provided by VLAN tagging functions of the S-VLAN components in a network, where an S-VID value in the range of 1-494 may be reserved for MPLS traffic while other values can be used for Ethernet traffic. More specifically, several S-VID values within this range can be reserved for MPLS traffic. The S-VID parameter and tagging functionality per se is known. Also, the network core bridge can be implemented by upgrading known network core bridges. In practice, this can be done in the form of a software update that provides the network core bridge in accordance with the above configuration. As is known, the S-VID is part of a so called S-tag of the frame. Thus, if there is no S-tag there is no S-VID either.

According to a further aspect a method is provided, which is performed by a network bridge configured to convey customer traffic between a customer equipment and any of an MPLS network and an Ethernet network, the network bridge comprising a C-VLAN component, an S-VLAN component and an MPLS component. The method comprises the steps of i) receiving from the customer equipment an Ethernet frame that carries the customer traffic, ii) forwarding the Ethernet frame to the S-VLAN component or to the MPLS component in dependence of a C-VID value of the Ethernet frame, iii) if the Ethernet frame is received by the MPLS component, adding MPLS information to the Ethernet frame, and forwarding the Ethernet frame to the S-VLAN component, and iv) forwarding the Ethernet frame to any of the MPLS network and the Ethernet network.

The method above as well as the network core bridge may implement any features of the previously described network bridge.

According to another aspect a method is provided, which is performed by a network core bridge configured to convey customer traffic, the network core bridge comprising an S-VLAN component and an MPLS entity. The method comprises the steps of i) receiving from a network node an Ethernet frame that carries the customer traffic, ii) forwarding the Ethernet frame to a next node or to the MPLS entity in dependence of a S-VID value of the Ethernet frame, and when the Ethernet frame is received from the S-VLAN component, iii) acting as a Label Switch Router and forward the Ethernet frame to a next node. The method performed by the network core bridge may implement any features of the previously described network core bridge.

According to still another aspect a computer-readable medium is provided, which stores processing instructions that, when executed by a processor, performs any of the methods above.

BRIEF DESCRIPTION OF THE DRAWINGS

Embodiments of the invention will now be described, by way of example, with reference to the accompanying schematic drawings, in which.

DETAILED DESCRIPTION

Figure 1:
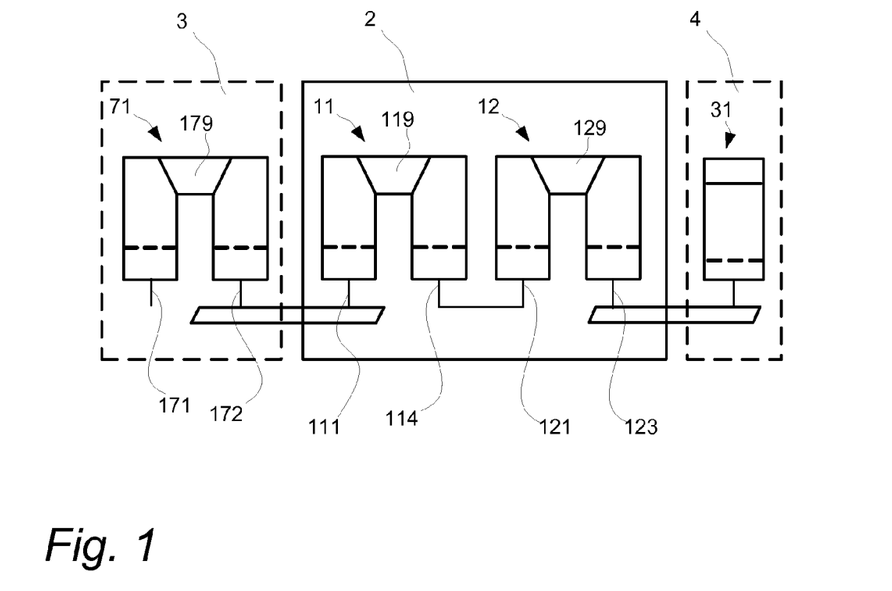
FIG. 1 is functional layer view of a C-tagged service interface to a Provider Bridged network.
Figure 2:
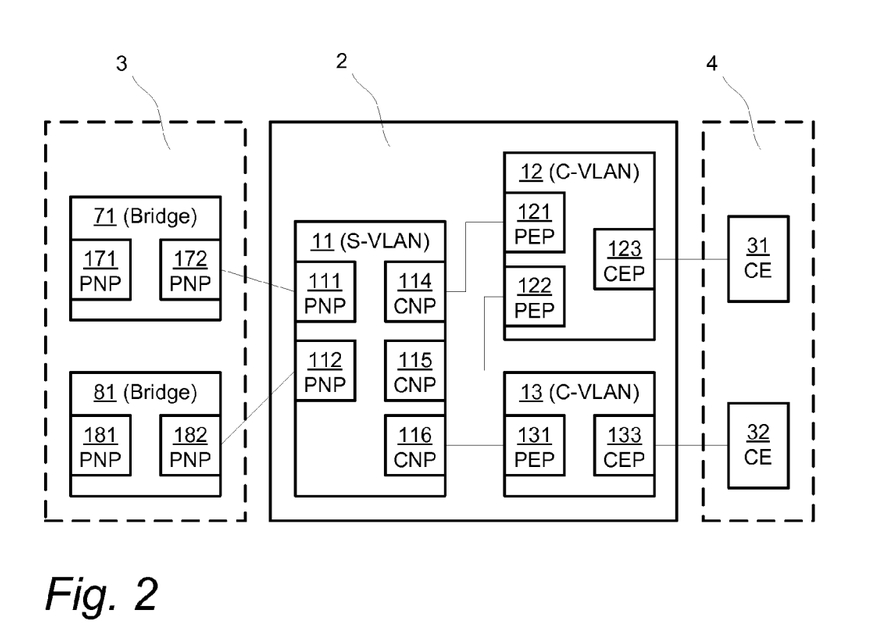
FIG. 2 is a high level view of the service interface of FIG. 1.

With reference to FIG. 1 and FIG. 2 a C-tagged service interface in a Provider Bridged network (PB-network) is illustrated, where FIG. 1 is a function layered view while FIG. 2 is a high level network view of the C-tagged service interface.

In detail, the C-tagged service interface comprises a provider edge bridge (PEB) 2 that connects a customer system 4 (that is associated with an end customer) with a provider network 3. The PEB 2 comprises an S-VLAN component 11 and, in this example, two C-VLAN components 12, 13. The S-VLAN component 11 has a number of Provider Network Ports (PNPB) 111, 112 and a number of Customer Network Ports (CNPs) 114, 115, 116, while each of the C-VLAN components 12, 13 has at least one Provider Edge Port (PEP) 121, 122, 131 and at least one Customer Edge Port (CEP) 123, 133.

The C-VLAN components 12, 13 are via the CEPs 123, 133 connected to a respective Customer Equipment (CE) 31, 32 of the customer system 4. The S-VLAN component 11 is in turn connected to the C-VLAN components 12, 13 via its CNPs 114, 115, 116 that are connected to the PEPS 121, 122, 131 of the C-VLAN components 12, 13. The provider network 3 comprises bridges 71, 81 of which each has a number of PNPB 171, 172, 181, 182 of which some are connected to the PNPB 111, 112 of the S-VLAN component 11, such that the S-VLAN component 11 is connected to the bridges 71, 81.

More specifically, the bridges 71, 81 can be so called S-VLAN bridges, the S-VLAN component 11 can be connected to the C-VLAN components via port based service interfaces and the C-VLAN components 12, 13 can be connected to the CEs 31, 32 via C-tagged service interfaces. As is known, each of the bridges, S-VLAN component and C-VLAN components comprise a MAC relay, as indicated by e.g. numerals 179, 119, 129.

The PEB 2 in which the C-tagged service interface is used is, for example, defined and configured according to the IEEE standard 802.1ad, and interconnects separate MACs of IEEE 802 LANs that compose the PB-network that relay frames to provide connectivity between all LANs that provide customer interfaces for each service instance.

A service provider of the PB-network can offer a customer one or more types of service interfaces of which each provides different capabilities, for example the service interface illustrated by FIG. 1 and FIG. 2. Segregation of different service instances is achieved by supporting each service instance with a separate Service VLAN (S-VLAN). To ensure the segregation of different service instances, the PBs can be configured such that no customer data frames are transmitted through a PNP untagged, i.e., without a Service VLAN Tag (S-Tag). A PNP can accept untagged frames but those frames are mainly transmitted internally to high layer entities to be processed based on their Ethertype.

A CNP of the S-VLAN component provides a single service instance. This interface can be referred to as a so called port-based service interface. A provider can differentiate individual customer service instances by associating each service instance with a different CNP. Frames transmitted to a CNP by a C-VLAN aware customer system does not include an S-VID (Service VLAN identifier). The C-tagged service interface can be provided by the illustrated PEB 2 that comprises one or more C-VLAN components attached to port-based service interfaces provided by a single S-VLAN component. Also, the C-tagged service interface provides service instance selection and identification by C-VID (Customer VLAN identifier).

Each Ethernet frame from the customer system 4 is assigned to a C-VLAN component and presented at zero or one internal port-based service interface. Each service interface supports a single service instance that the customer desires to carry via C-VLAN component.

In a similar manner, each frame from the provider network 3 is assigned to an internal interface on the basis of S-VID. The S-TAG is removed at this interface. The relevant C-VLAN component then applies a configurable PVID to frames so that their topmost Ethertype is not a C-TAG received on each internal "LAN", and correspondingly associates each received frame with a C-VLAN, which is controlled by VLAN configuration parameters, on the C-VLAN component. The C-VLAN component has control over the delivery of frames through the CEP. As illustrated, each CEP is supported by a dedicated C-VLAN component.

The terms "Customer Network Port", "Customer Edge Port", "Provider Network Port" and "Provider Edge Port" do not refer to or involve any ownership of the equipment and does not mean that the ports must be implemented differently, but rather refers to which requirements and roles within a structured provider network design the ports are configured to fulfill.

All "network" ports of the PEB 2 are part of S-VLAN component while all "edge" ports are part of C-VLAN components, whereas all "customer" ports receive data from a single customer inbound to the network (via the PEB) and transmit data outbound from the network to a single customer.

Thus, a Customer Edge Port may typically be a C-VLAN component port on a PEB 2 that is connected to customer owned equipment and receives and transmits Ethernet frames for a single customer.

A PEP may typically be a C-VLAN component Port within a PEB that connects to a Customer Network Port (CNP) and receives and transmits frames for a single customer.

A CNP may typically be an S-VLAN component port on a provider bridge (PB) or within a PEB that receives and transmits Ethernet frames for a single customer.

A PNP may typically be an S-VLAN component port on a PB that can transmit and receive Ethernet frames for multiple customers.

Figure 3:
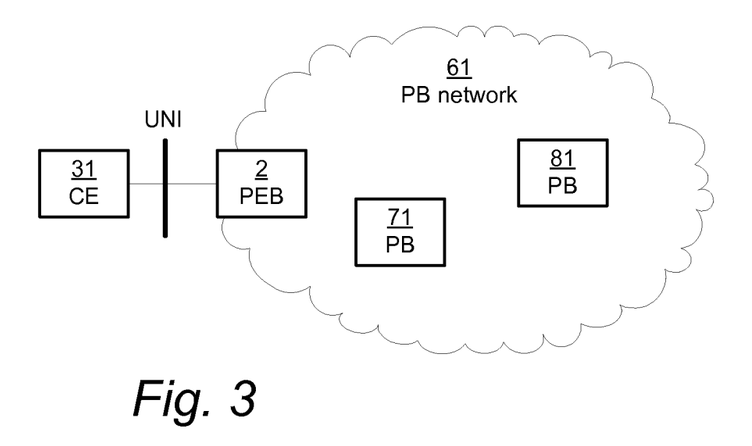
FIG. 3 illustrates a Provider Bridged network that employs the service interface of FIG. 1.

The PEB 2 is adapted to support migration from a PB-network to an MPLS network. With further reference to FIG. 3, the PEB 2 is illustrated as part of a PB-network 61, which can also be referred to as an Ethernet network, in combination with the bridges 71, 81 that are also part of the PB-network 61. A User-Network Interface (UNI) is provided between the PEB 2 and the CE 31.

Figure 4:
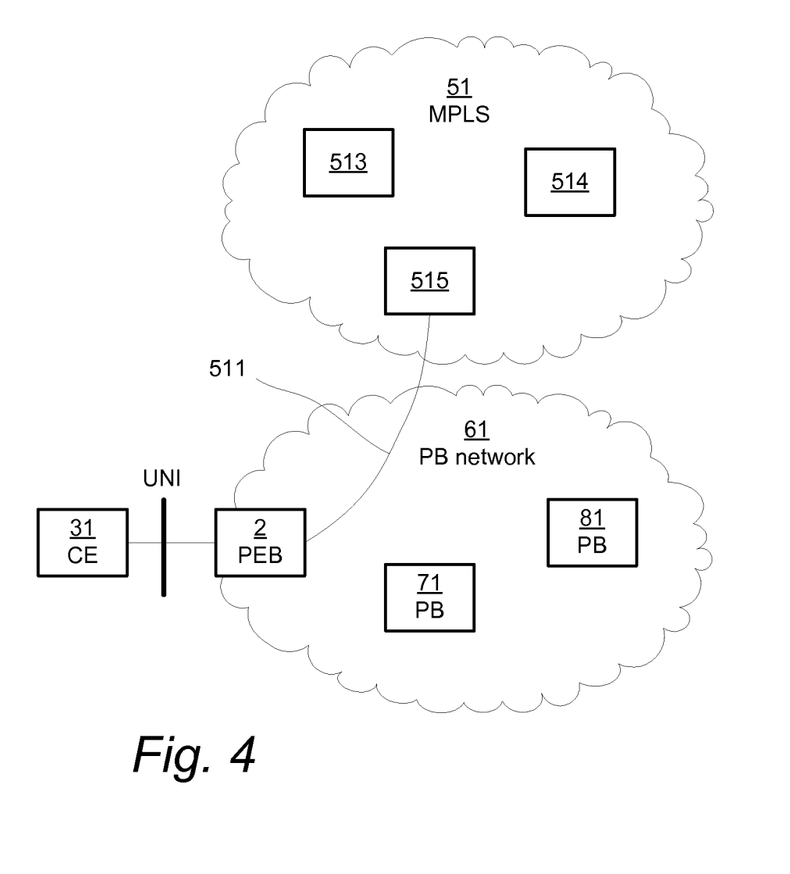
FIG. 4 illustrates coexistence of the Provider Bridged network of FIG. 3 and an MPLS network.
Figure 5:
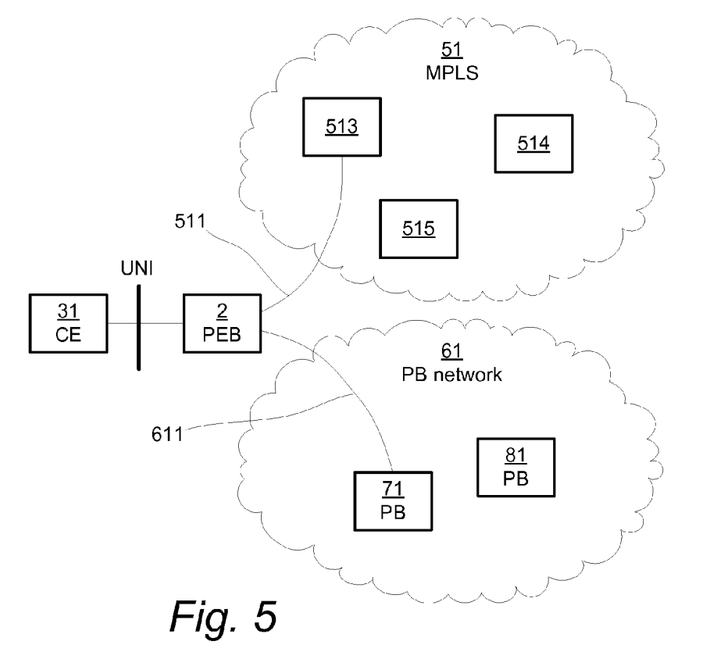
FIG. 5 is a high level view of a Provider Edge Bridge connected to the coexisting networks of FIG. 4.

With further reference to FIG. 4 and FIG. 5, the migration provides an MPLS network 51 alongside the PB-network 61, and PB equipment 71, 81 and MPLS equipment 513, 514, 515 will thus coexist in the same overall network (that hence comprises both the MPLS network 51 and the PB-network 61). It can be assumed that predominant services carried by the overall network will be Ethernet services, and that the interface equipment (i.e. the PEB 2) of the operator assigns some traffic to the PB-network 61 and some to the MPLS network 51, e.g. based on the received C-VIDs of the customer traffic.

This requires certain Provider Edge Bridges/Provider Bridges (PEBs/PBs) to be able to support both PB based traffic 611 and MPLS based traffic 511 on the same physical network ports at the same time. In addition, different types of traffic should be forwarded differently (i.e. Ethernet traffic 611 to the PB-network 61 and MPLS traffic 511 to the MPLS network 51).

In the overall network separation is used for identifying different traffic flow. One alternative lies in that the MPLS based traffic (services) and PB based traffic (services) are segregated by the negotiated C-VLAN that is set between the customer and operator; some C-VLANs are dedicated to customer traffic which uses MPLS-based service while the other C-VLANs are dedicated to customer traffic which uses PB-based service. This solution is schematically illustrated by FIG. 5.

Figure 6:
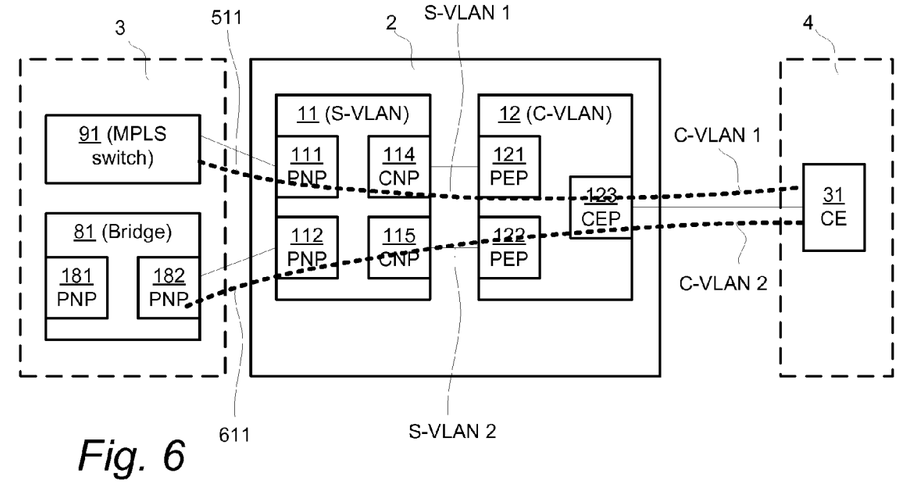
FIG. 6 illustrates a VLAN configuration example for a Provider Edge Bridge.

With reference to FIG. 6 the solution of FIG. 5 is illustrated in further detail, showing a detailed VLAN configuration in a PEB 2 that corresponds to the PEB of FIG. 1 and is connected to a corresponding CE 31. In the shown configuration one customer is assumed and the PEB 2 is in addition connected to an MPLS switch 91 of the provider network 3. The provider network is in this case the overall network that comprises both the PB-network and MPLS network.

After negotiation with the operator, the C-VLAN 1 (see FIG. 6) can be transported by MPLS-based technology and the C-VLAN 2 (see FIG. 6) can be transported by a PB-based technology. In this context, the different transport technologies are referred to as customer MPLS traffic and customer Ethernet traffic/customer PB traffic.

All customer MPLS traffic from CE 31 is tagged with a special C-VID and is forwarded to a certain PEP 121. All customer Ethernet traffic is forwarded to other PEPS in accordance with conventional PEB operation in order to be transported on S-VLAN tunnels on basis of a service level agreement with the customer associated with the CE 31.

CNP 114 receives customer MPLS traffic and is configured to add a special S-VID (S-VID 1 in this example) in order to identify the customer MPLS traffic.

A certain PNP port 111 is configured to allow only S-VLAN tagged frames of S-VID 1 to be forwarded or enter though it. MPLS equipment such as an MPLS switch 91 is connected to this PNP 111. The associated port on MPLS equipment 91 is configured to only receive/transmit Ethernet frames that comprises S-VLAN 1. It then removes the S-VLAN tag and forwards untagged Ethernet frames to the MPLS network.

In this example a single-customer case is used. If there are two customers a new S-VLAN in the CNP is configured for the new customer MPLS traffic. The corresponding PNP is then also configured to accept customer MPLS traffic with this new S-VID. The connecting port of MPLS equipment is then configured to accept the new S-VID.

This example illustrates one possible configuration for a PEB to support customer MPLS traffic. In other embodiments, customer MPLS traffic may pass through a number of provider bridges before reaching MPLS network. In that case those PBs are also properly configured to forward customer MPLS traffic.

With the increase of the number of customers requiring MPLS based service, the described configuration can become somewhat challenging. Also, the solution should provide a new S-VID for each new customer transmitting customer MPLS traffic, which can cause problems as the number of S-VLANs is limited.

To address this situation an MPLS component is implemented. The MPLS component can be a software module or a hardware module on top of an existing Ethernet bridge. It can initiate and terminate Label Switched Paths (LSPs) and is configured to provide functionality that corresponds to a Label Edge Router (LER). The MPLS component can be integrated into the PEB architecture.

The function of the MPLS component is to encapsulate/decapsulate customer MPLS traffic, i.e. add/remove MPLS Ethertype and MPLS Labels, and provide a way of differentiating customer MPLS traffic service instance. Also, an MPLS entity is implemented as a high layer entity of the bridge, and provides functionality that is equivalent to a Label Switch Router (LSR). If a PNP receives an untagged Ethernet frame or specially tagged frame, the untagged frame is transmitted to high layer entities. If the Ethertype of the untagged or specially tagged frame is an MPLS Ethertype the frame is processed by the MPLS entity. The MPLS entity then forwards the MPLS frame as an LSR to an outgoing port. By combining the MPLS component and MPLS entity, a 2-step smooth migration roadmap for PB-network to support MPLS traffic is provided.

In brief, the first step comprises a software update based on existing PB (and PEB) hardware for making it a hybrid device, and includes i) keeping the user network interface the same as before and upgrade the PB to support MPLS traffic and Ethernet traffic simultaneously by adding the MPLS component and MPLS entity, ii) upgrading PB to support MPLS traffic and Ethernet traffic simultaneously by adding the MPLS entity, and iii) allowing the old PB-network to support customer MPLS traffic and Ethernet traffic simultaneously.

The second step 2 comprises building a dedicated MPLS network domain adjacent PB-network, and includes i) keeping the user network interface the same as before, and ii) forwarding customer MPLS traffic to the dedicated MPLS domain, where the customer MPLS traffic can be untagged Ethernet traffic or tagged Ethernet traffic with a dedicated S-VID.

Figure 7A:
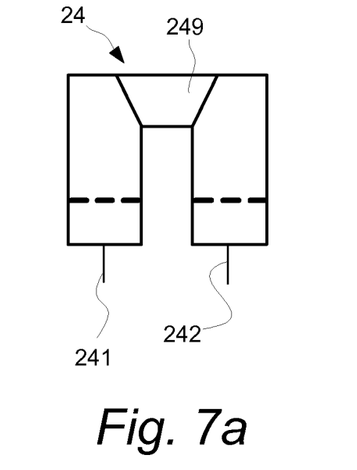
FIGS. 7a-b illustrates an MPLS component that can assist in migration from Provider Bridged network to MPLS network.
Figure 7B:
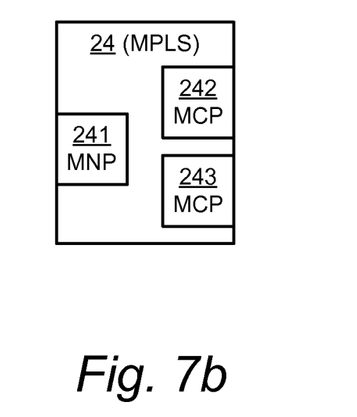

With reference to FIG. 7a the MPLS component is shown in a function layered view while FIG. 7b is a high level network view of the MPLS component. In further detail, the MPLS component 24 can be a software module or a hardware module on top of a conventional Ethernet bridge. It initiates and terminates LSPs and provides functionality corresponding to a LER. The MPLS component 24 component can be readily integrated in the architecture of a conventional PEB.

The MPLS component has one or more MPLS Customer Ports (MCPs) 242, 243 and an MPLS Network Port (MNP) 241. Each MCP 242, 243 is connected internally to a PEP of a C-VLAN component associated with a specific end customer/CE. The MNP is connected internally to an internal PNP on a S-VLAN component.

The MCP receives/transmits frames from/to the PEP. Those frames are untagged or with C-tags if multiple C-VLANs are supported. An MPLS engine (entity) 249 inside MPLS component 24 initiates and terminates LSPs, which provides the functionality equivalent to a LER. It thus adds/removes MPLS information to the customer MPLS traffic.

The MNP 241 receives/transmits frames from/to the internal PNP. Those frames are untagged or with C-tags if multiple C-VLANs are supported. The internal PNP is configured to forward traffic to the high layer entities in the S-VLAN component.

Figure 8:
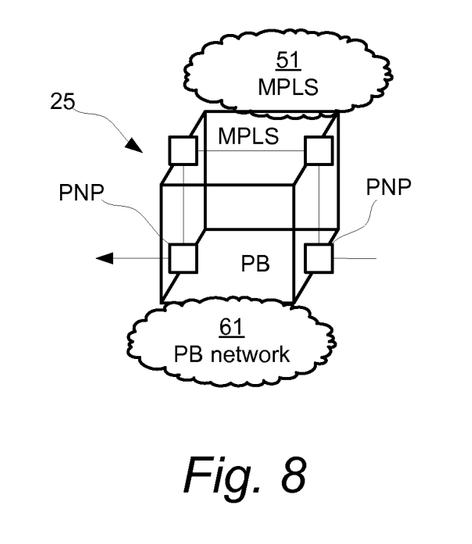
FIG. 8: illustrates an MPLS entity that can assist in migration from Provider Bridged network to MPLS network.

With reference to FIG. 8 the MPLS entity 25 is a high layer entity which provides functionality that is equivalent to a LSR. For the MPLS entity 25, one PNP is configured to forward the untagged Ethernet frame or specially tagged Ethernet frame to high layer entities. If the Ethertype of the frame is MPLS Ethertype, the frame is processed by the MPLS entity 25. The MPLS entity 25 then forwards the MPLS frame as an LSR and chooses the exiting port in the S-VLAN component.

A convenient migration procedure to add MPLS traffic support in a PB-network by using the MPLS component 2 and the MPLS entity 25 can be provided. The detailed migration steps can be described by a first and second migration step.

For the first migration step it is assumed that the operator has a PB-network similar to that of FIG. 3. It may be estimated that a part of the customers want to use MPLS-based service, but it is often not economically feasible to build an MPLS network from scratch. Then suitable existing provider bridges can be updated to support MPLS traffic by adding a software module that implements the MPLS component and entity.

Figure 9:
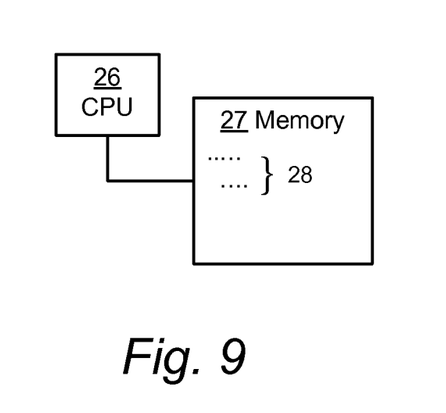
FIG. 9 illustrates a processor unit of a provider edge bridge that can implement the MPLS component of FIGS. 7a-b and the MPLS entity of FIG. 8.

With reference to FIG. 9 an MPLS component in the form of a software module is added a PEB to provide MPLS traffic construction and differentiation. For this purpose the PEB that comprises the MPLS component includes a processor unit (CPU) 26 and a memory unit 27 (i.e. a computer-readable medium) connected to the processor unit 26. The memory unit 27 must not necessarily be incorporated within the PEB, but is anyhow used for storing processing (software) instructions 28 that, when executed by the processor unit 26, implements the MPLS component 24 and/or the MPLS entity.

MPLS entities are implemented in the higher layer entities of the S-VLAN component to provide MPLS traffic forwarding. The Ethernet traffic and MPLS traffic can be differentiated by the S-TAGs in the network. MPLS traffic can be encapsulated either in untagged Ethernet frames or a special S-VLAN tagged Ethernet frames.

Figure 10:
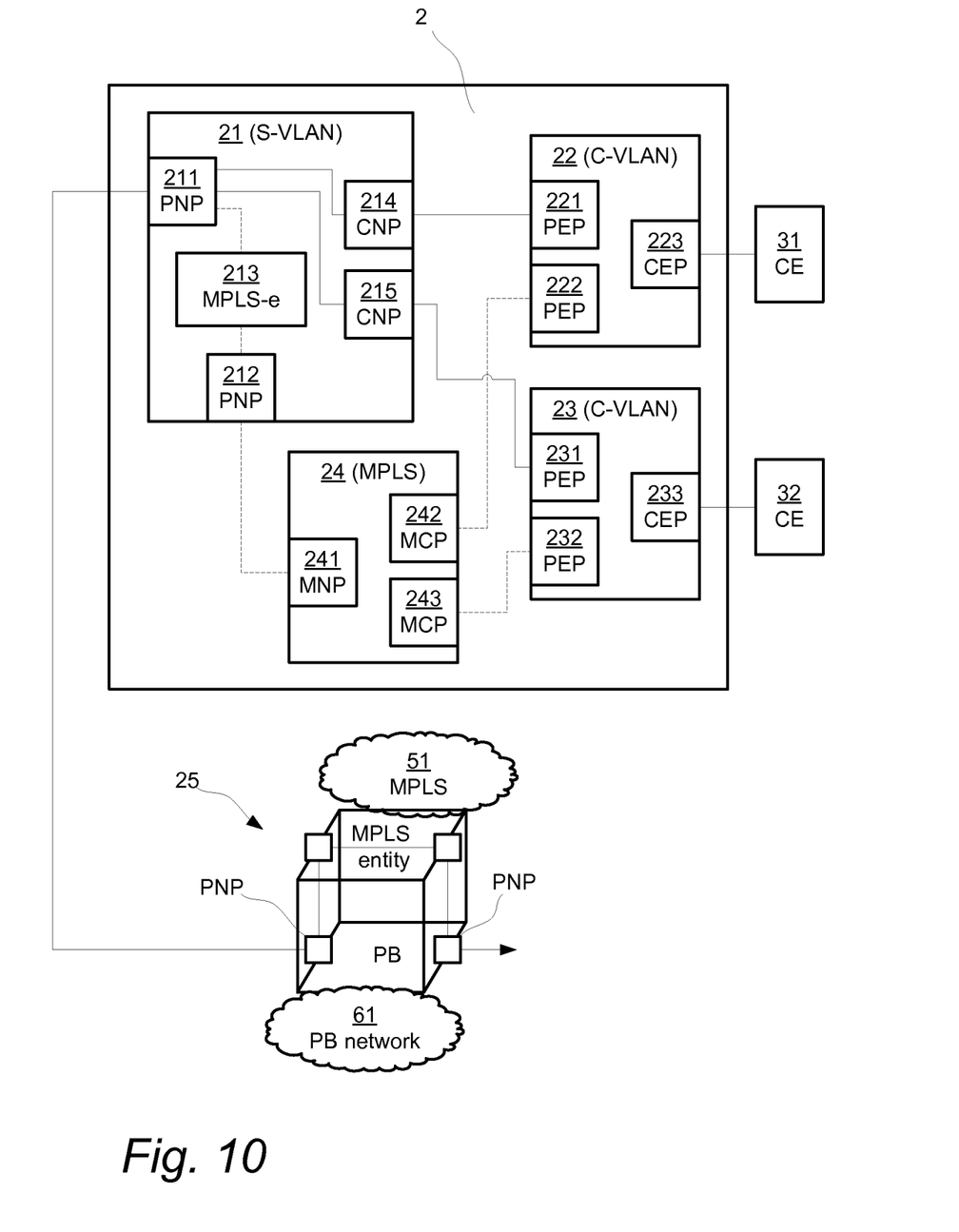
FIG. 10 illustrates an embodiment of the migration from Provider Bridged network to MPLS network.

With reference to FIG. 10 a configuration of a PB-network that support MPLS traffic is illustrated. In detail, a PEB 2 comprises an S-VLAN component 21, two C-VLAN components 22, 23 and the above described MPLS component 24. The first C-VLAN component 22 comprises a number of PEPS 221, 222 and a CEP 223 that is connected to a first CE 31. The second C-VLAN component 23 comprises a number of PEPS 231, 232 and a CEP 233 that is connected to a second CE 32. The S-VLAN component 21 has a first CNP 214 connected to the PEP 221 of the first C-VLAN component 22 and a second CNP 215 connected to the PEP 231 of the second C-VLAN component 23. The MPLS component 24 in this example comprises a MNP 241 and two MCPs that are connected to a respective PEP 222, 232 of the C-VLAN components 22, 23.

For the illustrated configuration, customers assign certain C-VLAN(s) for their MPLS traffic. The CEP 223 in the first C-VLAN component 22 is configured to forward those C-VLAN(s) to a dedicated PEP 222. The corresponding situation applies for the second C-VLAN component 23, i.e. forward to PEP 232. Those dedicated PEPS 222, 232 are connected internally with a respective MCP 242, 243 of the MPLS component 24. The MCPs 242, 243 of the MPLS component 24 are configured to accept untagged Ethernet frames (i.e. no S-VLAN tag, while frames can still have C-VLAN tags).

After an MCP receives untagged Ethernet frames, an MPLS engine (functionality) in the MPLS component 24 processes those frames (i.e. add MPLS labels, MPLS Ethertype and other MPLS related information) based on MPLS rules. The untagged Ethernet frames are then forwarded by the MNP 241 to an internally connected PNP 212 of the S-VLAN component 21.

This internal PNP 212 is specially configured to forward those Ethernet frames to the higher layer entities that is implemented as an MPLS entity 213 of the S-VLAN component 21. The internal PNP 212 also filters those Ethernet frames to avoid duplicated frames. The MPLS entity 213 recognizes those frames based on MPLS Ethertype and guides them directly to a PNP 211 of the S-VLAN component that interfaces e.g. provider network 25 based on the MPLS information. The provider network 25 thus includes both a PB-network 61 and an MPLS network 51. If an S-VID is not present in a frame received at the PNP 212 connected to the MPLS component 24, the S-VLAN component can add an S-VID. The S-VID may then be selected such that it is indicative of MPLS traffic.

For supporting PB traffic the PEB 2 includes functionality described in connection with e.g. FIGS. 1 and 2 above, which involves an implementation according to known standards and protocols for supporting conventional Ethernet traffic.

When a provider bridge with MPLS traffic support receives Ethernet frames, its PNP is configured to forward the untagged Ethernet frame or specially tagged Ethernet frame to high layer entities while the PNP filters those special frames to avoid duplicate frames in the network. An MPLS entity then recognizes those frames based on Ethertype and processes those frames. The MPLS entity decides to which physical port those frames shall be transmitted. From the perspective an outsider, those Ethernet frames are transmitted as if done by the provider bridge PNP.

In the second step of the 2-step smooth migration roadmap for PB-network to support MPLS traffic, the operator may arrange an independent MPLS domain to handle MPLS-based service. When doing so it is not necessary to change the interface or disrupt existing Ethernet service.

Figure 11:
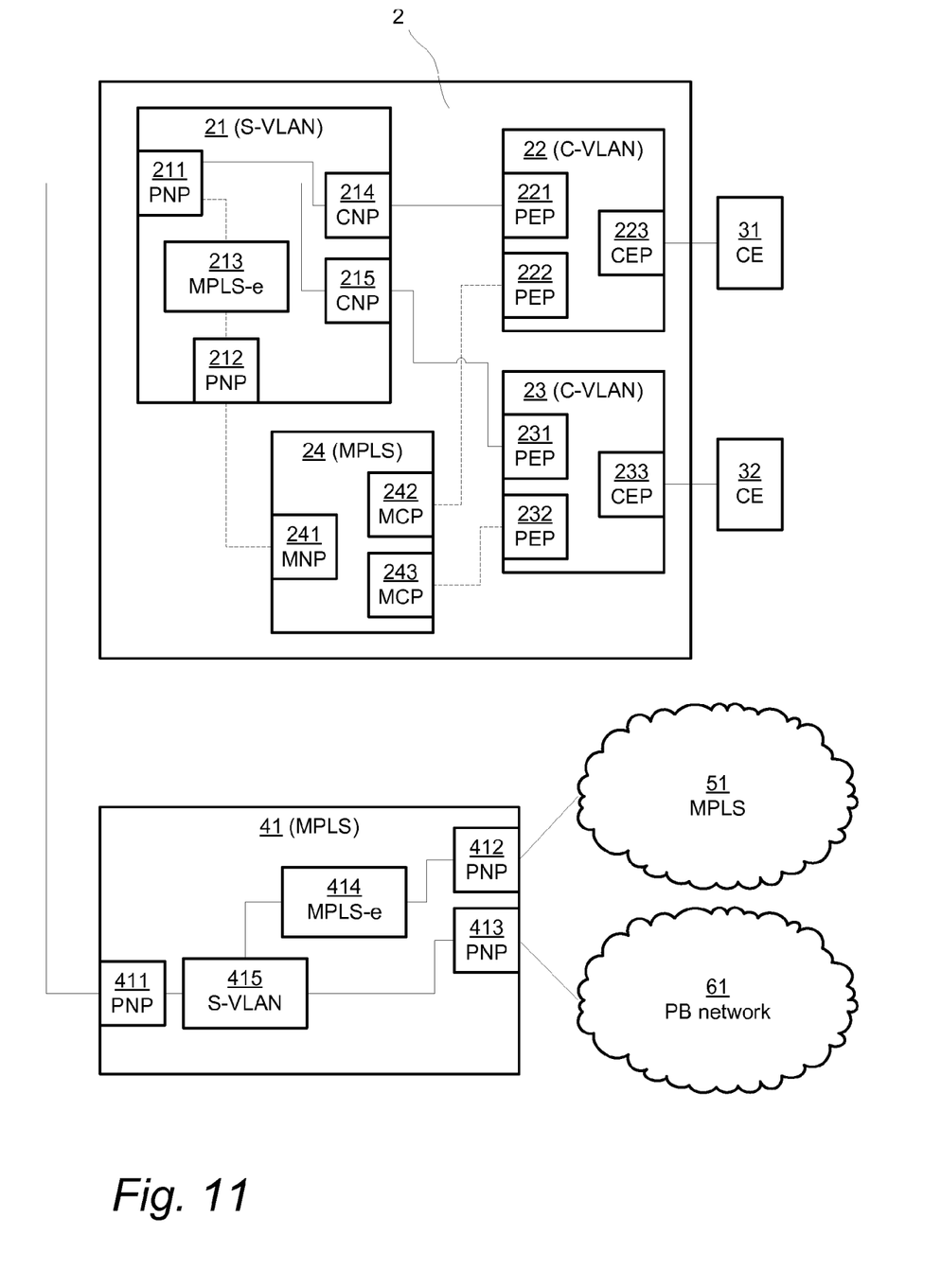
FIG. 11 illustrates a further embodiment of the migration from Provider Bridged network to MPLS network.

This can be achieved by guiding MPLS traffic to the MPLS network as illustrated in FIG. 11, where the PEB 2 with MPLS traffic support is the same as the one illustrated in FIG. 10.

Here an S-VLAN Bridge 41 with MPLS traffic support comprises an MPLS entity 414 and PNPB 411, 412, 413 that corresponds to the MPLS entity and PNPB of the S-VLAN component 21 of the PEB 2. An S-VLAN component 415 of the S-VLAN Bridge 41, which typically may be a so called network core bridge, can receive a frame from the PNP 411 and then forward it either to the MPLS entity 414 or to the PNP 413. A frame is forwarded to the MPLS entity 414 e.g. if an S-VID of the frame indicates that the frame concerns MPLS traffic. Otherwise it is forwarded to the PNP 413. The MPLS entity 414 forwards the frame to the PNP 412. In principle, the S-VLAN component 415 may correspond to the S-VLAN component 21 of the bridge 2. The S-VLAN Bridge 41 can thus act as a network core bridge that receives a frame from one network node and forwards it to another network node. For performing the described operation the S-VLAN Bridge 41 may comprise a a processor unit (CPU) and a memory unit (i.e. a computer-readable medium) connected to the processor unit, which in combination can have a layout that corresponds to the illustration of FIG. 9.

The S-VLAN bridge 41 forwards those Ethernet frames (untagged or special S-VLAN tagged depending on the configuration) to the MPLS Network 51. And when an MPLS interface port receives those (special MPLS) Ethernet frames, it processes them (i.e. adds/removes S-TAGs) and forwards them to MPLS equipments in the MPLS network 51.

Some technical issues are to be notified. For example, when a PNP receives special Ethernet frames (MPLS traffic), those frames are filtered if an MPLS entity is available to avoid duplicated frames. A PNP can be configured to filter the special S-VID if the S-VID is to be processed by an MPLS entity. A more flexible solution can be to use a certain MAC destination address for all customer MPLS traffic. Then all traffic with the certain MAC address may be filtered by the bridges the implement the MPLS entity while the normal Ethernet traffic will be forwarded as before to the PB-network 61. Bridges that do not implement the MPLS entity will forward the MPLS traffic as any other data traffic, based on the corresponding information in the frame.

In the mapping of MPLS traffic to S-VLAN tagged frames with specific S-VID values, it is possible to map MPLS traffic from different customers to different S-VIDs. This might however require additional configuration and more S-VID consumption, or a single S-VID can be assigned for all MPLS traffic from all the customers. The choice of this S-VID can be configured by a special value of the "MSTID" in the so called MST Configuration Table.

The PEB with the MPLS component/entity offers a solution for existing PB-networks to support MPLS traffic. It is compatible with standards and does require the interface of existing equipments to be changed. The solution can be implemented as a software or hardware add-on to the existing PBs or as an independent equipment. It may support hot swap and can cause minimal level service disruption for customers. The interface must not be changed and from an outsider's perspective the bridge can appear exactly as before but with the additional function of supporting MPLS traffic.

Figure 12:
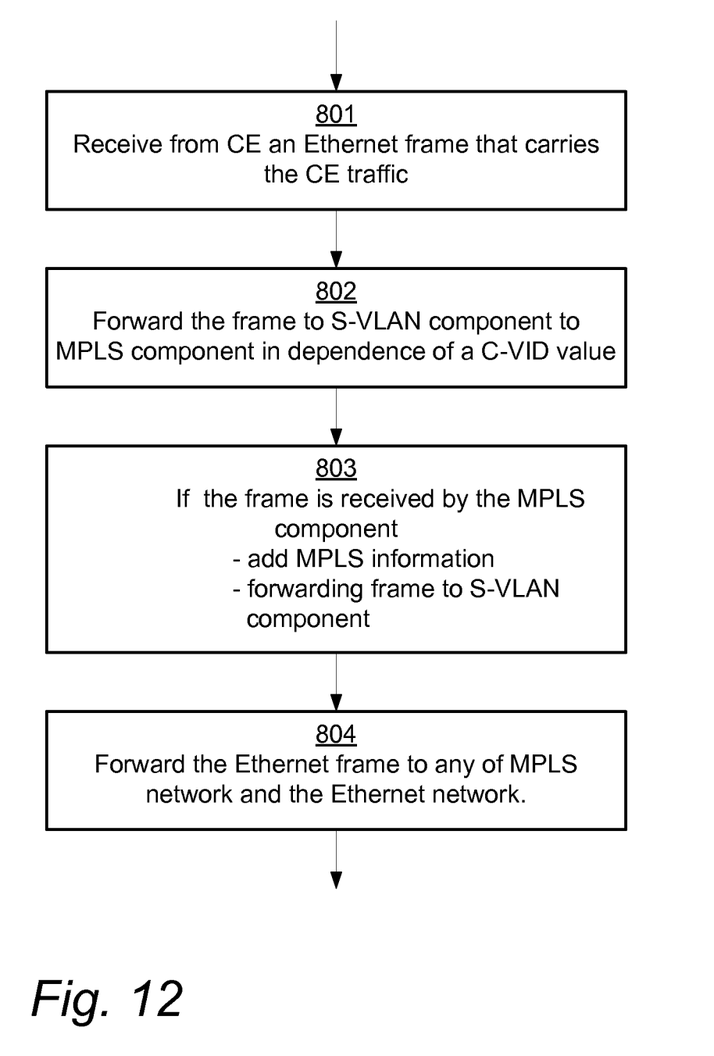
FIG. 12 illustrates a method performed by a network edge bridge that can assist in the migration from Provider Bridged network to MPLS network.

The support by the MPLS traffic can as indicated be implemented as a method performed by a network bridge configured to convey customer traffic between the customer equipment 31 and any of the MPLS network 51 and the Ethernet network 61. The network bridge comprising the C-VLAN component 22, the S-VLAN component 21 and the MPLS component 24. With reference to FIG. 12, the method then comprises the steps of receiving 801 from the customer equipment 31 an Ethernet frame that carries the customer traffic. Next the Ethernet frame is forwarded 802 to the S-VLAN component 21 or to the MPLS component 24 in dependence of a C-VID value of the Ethernet frame. In the next step 803, if the Ethernet frame was received by the MPLS component 24, MPLS information is added to the Ethernet frame and the Ethernet frame is forwarded to the S-VLAN component 21. Finally, the Ethernet frame is forwarded 804 to any of the MPLS network 51 and the Ethernet network 61.

The PBs (including both provider edge bridges and provider bridges) described herein are in addition implemented according to known standards and protocols within the field of communication over an Ethernet based network respectively an MPLS based network. The software instructions, i.e. the computer program code for carrying out the previously discussed functionality and method may for development convenience be written in a high-level programming language such as Java, C, and/or C++ but also in other programming languages, such as, but not limited to, interpreted languages. Some modules or routines of the method may be written in assembly language or even micro-code to enhance performance and/or memory usage.

Although various embodiments of the invention have been described and shown, the invention is not restricted thereto, but may also be embodied in other ways within the scope of the subject-matter defined in the following claims. Also, the terms used herein refers to functional relationships, not ownership of the various components.

The invention claimed is:

1. A network bridge configured to convey customer traffic between a customer equipment and any of a Multiple Protocol Label Switching (MPLS) network and an Ethernet network, the network bridge comprising:
   a Customer Virtual Local Area Network (C-VLAN) component,
   a Service VLAN (S-VLAN) component that comprises a first provider network port (PNP) configured to receive Ethernet frames from an MPLS entity and act as an exiting port by forwarding Ethernet frames to a node of any of the MPLS network and the Ethernet network and
   an MPLS component,
   wherein the C-VLAN component is configured to:
      receive from the customer equipment an Ethernet frame that carries the customer traffic, and
      forward the Ethernet frame to the S-VLAN component or to the MPLS component in dependence of a Customer VLAN identifier (C-VID) value of the Ethernet frame;
   wherein the MPLS component is configured, when the Ethernet frame is received from the C-VLAN component, to:
      add MPLS information to the Ethernet frame, and
      forward the Ethernet frame to the S-VLAN component,
   wherein the S-VLAN component is configured to forward the Ethernet frame to any of the MPLS network and the Ethernet network.

2. The network bridge according to claim 1, wherein the MPLS component is configured to initiate and terminate Label Switched Paths.

3. The network bridge according to claim 1, wherein the MPLS component is configured to act as a Label Edge Router.

4. The network bridge according to claim 1, wherein the MPLS component comprises an MPLS customer port (MCP) that is connected to a provider edge port (PEP) of the C-VLAN component.

5. The network bridge according to claim 1, wherein the MPLS component comprises an MPLS network port (MNP) that is connected to a provider network port (PNP) of the S-VLAN component.

6. The network bridge according to claim 1, wherein the C-VLAN component comprises a customer edge port (CEP) dedicated to MPLS traffic from the customer equipment.

7. The network bridge according to claim 1, wherein the C-VLAN component comprises a provider edge port (PEP) dedicated to Ethernet traffic to the S-VLAN component.

8. The network bridge according to claim 1, wherein the C-VLAN component comprises a provider edge port (PEP) dedicated to MPLS traffic to the MPLS component.

9. The network bridge according to claim 1, wherein the S-VLAN component comprises an MPLS entity that is configured to act as a Label Switch Router.

10. The network bridge according to claim 9, wherein the S-VLAN component is configured to forward the Ethernet frame to the MPLS entity if the Ethernet frame is untagged or specifically tagged.

11. The network bridge according to claim 1, having the form of a conventional network bridge that is upgraded with software instructions that implements the MPLS component.

12. The network bridge according to claim 9, wherein the software instructions implements the MPLS entity of the S-VLAN component.

13. The network bridge according to claim 1, comprising a central processing unit configured to execute software instructions that implement the MPLS component.

14. A network core bridge configured to convey customer traffic, the network core bridge comprising:
a Service Virtual Local Area Network (S-VLAN) component that comprises a first provider network port (PNP) configured to receive Ethernet frames from a network node and a second PNP configured to act as an exiting port configured to forward Ethernet frames to a node of the Ethernet network or a Multiple Protocol Label Switching (MPLS) entity,
wherein the S-VLAN component is configured to:
receive from a network node an Ethernet frame that carries the customer traffic, and
forward the Ethernet frame to a next node or to the MPLS entity in dependence of a Service VLAN identifier (S-VID) value of the Ethernet frame, wherein the MPLS entity is configured, when the Ethernet frame is received from the S-VLAN component, to:
act as a Label Switch Router and forward the Ethernet frame to a next node.

15. A method performed by a network bridge configured to convey customer traffic between a customer equipment and any of a Multiple Protocol Label Switching (MPLS) network and an Ethernet network, the network bridge comprising a Customer Virtual Local Area Network (C-VLAN) component, a Service VLAN (S-VLAN) component and an MPLS component, the method comprising the steps of:
receiving from the customer equipment an Ethernet frame that carries the customer traffic,
forwarding the Ethernet frame to the S-VLAN component or to the MPLS component in dependence of a Customer VLAN identifier (C-VID) value of the Ethernet frame
if the Ethernet frame is received by the MPLS component:
adding MPLS information to the Ethernet frame,
forwarding the Ethernet frame to the S-VLAN component, and
routing the Ethernet frame to an MPLS entity of the S-VLAN component; and
from a first provider network port (PNP) of the S-VLAN component configured to act as an exiting port, forwarding the Ethernet frame to any of the MPLS network and the Ethernet network.

16. A non-transitory computer readable medium storing processing instructions that, when executed by a processor, performs a method in a network bridge configured to convey customer traffic between a customer equipment and any of a Multiple Protocol Label Switching (MPLS) network and an Ethernet network, the network bridge comprising a Customer Virtual Local Area Network (C-VLAN) component, a Service VLAN (S-VLAN) component and an MPLS component, the method comprising the steps of:
receiving from the customer equipment an Ethernet frame that carries the customer traffic,
forwarding the Ethernet frame to the S-VLAN component or to the MPLS component in dependence of a Customer VLAN identifier (C-VID) value of the Ethernet frame
if the Ethernet frame is received by the MPLS component;
adding MPLS information to the Ethernet frame,
forwarding the Ethernet frame to the S-VLAN component, and
routing the Ethernet frame to an MPLS entity of the S-VLAN component; and
from a first provider network port (PNP) of the S-VLAN component configured to act as an exiting port, forwarding the Ethernet frame to any of the MPLS network and the Ethernet network.

* * * * *